(12) United States Patent
Tsuchida

(10) Patent No.: US 11,073,371 B2
(45) Date of Patent: Jul. 27, 2021

(54) APPARATUS AND METHOD FOR OPTICAL ANGLE MODULATION MEASUREMENT BY A DELAYED SELF-HETERODYNE METHOD

(71) Applicant: NATIONAL INSTITUTE OF ADVANCED INDUSTRIAL SCIENCE AND TECHNOLOGY, Tokyo (JP)

(72) Inventor: Hidemi Tsuchida, Tsukuba (JP)

(73) Assignee: NATIONAL INSTITUTE OF ADVANCED INDUSTRIAL SCIENCE AND TECHNOLOGY

( * ) Notice: Subject to any disclaimer, the term of this patent is extended or adjusted under 35 U.S.C. 154(b) by 77 days.

(21) Appl. No.: 16/340,164

(22) PCT Filed: Oct. 11, 2017

(86) PCT No.: PCT/JP2017/036868
§ 371 (c)(1),
(2) Date: May 14, 2019

(87) PCT Pub. No.: WO2018/070442
PCT Pub. Date: Apr. 19, 2018

(65) Prior Publication Data
US 2019/0257641 A1    Aug. 22, 2019

(30) Foreign Application Priority Data
Oct. 12, 2016   (JP) .............................. JP2016-200764

(51) Int. Cl.
*G01B 9/02*    (2006.01)
*G01J 9/02*    (2006.01)
(Continued)

(52) U.S. Cl.
CPC ........... *G01B 9/02083* (2013.01); *G01B 9/02* (2013.01); *G01J 9/02* (2013.01); *G01J 9/04* (2013.01); *G01S 7/481* (2013.01); *G01S 17/08* (2013.01)

(58) Field of Classification Search
None
See application file for complete search history.

(56) References Cited

U.S. PATENT DOCUMENTS

| | | | |
|---|---|---|---|
| 5,412,471 A | 5/1995 | Tada et al. | 356/350 |
| 5,420,688 A | 5/1995 | Farah | 356/358 |

(Continued)

FOREIGN PATENT DOCUMENTS

| | | |
|---|---|---|
| CA | 2980954 A1 | 9/2016 |
| JP | 4-339212 A | 11/1992 |

(Continued)

OTHER PUBLICATIONS

Search Report dated Jan. 9, 2018 issued in corresponding International Patent Application No. PCT/JP2017/036868.
(Continued)

*Primary Examiner* — Michael P LaPage
(74) *Attorney, Agent, or Firm* — Ostrolenk Faber LLP

(57) ABSTRACT

An apparatus and a method which enable, in optical angle modulation, measurement of laser light, to measure by a delayed self-heterodyne method, accurate measurement of a temporal waveform of optical angle modulation, without any influence by light intensity modulation, without necessity of for calibration, and without necessity for stabilizing an interferometer. In an optical angle modulation measurement apparatus using a delayed self-heterodyne method, a heterodyne interferometer that is fed with laser light to be measured; a photodetector that receives output light of the heterodyne interferometer and performs heterodyne detec-
(Continued)

tion of the output light to output a beat signal; using a phase demodulator that is configured to demodulate a phase of a beat signal; and a temporal waveform analyzer that is configured to obtain a temporal waveform of optical angle modulation, from the phase of the beat signal. In an optical angle modulation measurement method by a delayed self-heterodyne method, laser light to be measured, which is optical-angle modulated is input to a heterodyne interferometer, heterodyne detection of the output light is performed by a photodetector, and a temporal waveform of optical angle modulation is obtained by demodulating a phase of the beat signal.

9 Claims, 6 Drawing Sheets

(51) Int. Cl.
  *G01S 7/481* (2006.01)
  *G01S 17/08* (2006.01)
  *G01J 9/04* (2006.01)

(56) References Cited

U.S. PATENT DOCUMENTS

| | | | |
|---|---|---|---|
| 2001/0028679 | A1 | 10/2001 | Chou ............................ 375/226 |
| 2017/0153327 | A1* | 6/2017 | Nishioka ................. G01S 17/58 |
| 2017/0350964 | A1* | 12/2017 | Kaneda ................... G01S 17/58 |
| 2020/0049799 | A1* | 2/2020 | Ando ....................... G01S 17/26 |

FOREIGN PATENT DOCUMENTS

| | | | |
|---|---|---|---|
| JP | 06-221808 A | 8/1994 | |
| JP | 09-042976 A | 2/1997 | |
| JP | 2000-028368 A | 1/2000 | |
| JP | 2003-149083 A | 5/2003 | |
| JP | 2012-088174 A | 5/2012 | |
| WO | WO-2016150783 A1 * | 9/2016 | ............. G01S 7/497 |

OTHER PUBLICATIONS

W.V.Sorin et al., "Frequency Domain Analysis of an Optical FM Discriminator", *Journal of Lightwave Technolology*, vol. 10, No. 6, pp. 787-793 (Jun. 1992).

T.N. Huynh et al., "Delayed Self-Heterodyne Phase Noise Measurements With Coherent Phase Modulation Detection", *IEEE Photonics Technology Letters*, vol. 24, No. 4, pp. 249-251 ( Feb. 15, 2012).

P.A. Roos et al., "Ultrabroadband optical chirp linearization for precision metrology applications", *Optics Letters*, vol. 34, No. 23, pp. 3692-3694 (Dec. 1, 2009).

W. Xie et al., "Fourier transform-limited optical frequency-modulated continuous-wave interferometry over several tens of laser coherence lengths", *Optics Letters*, vol. 41, No. 13, pp. 2962-2965 (Jul. 1, 2016).

Kikuta H, Iwata K, Nagata R, "Absolute distance measurement by wavelength shift interferometry with a laser diode: some systematic error sources", *Applied Optics*, (May 1, 1987), vol. 26, No. 9, pp. 1654-1660.

* cited by examiner

PRIOR ART

PRIOR ART

APPARATUS AND METHOD FOR OPTICAL ANGLE MODULATION MEASUREMENT BY A DELAYED SELF-HETERODYNE METHOD

CROSS REFERENCE TO RELATED APPLICATIONS

The present application is a 35 U.S.C. § 371 national phase conversion of PCT/JP2017/036868, filed Oct. 11, 2017, the contents of which are incorporated herein by reference which claims priority of Japanese Patent Application No. 2016-200764, filed Oct. 12, 2016, the contents of which are incorporated by reference herein. The PCT International Application was published in the Japanese language.

TECHNICAL FIELD

The present invention relates to an optical angle modulation measurement apparatus and an optical angle modulation measurement method suitable for high-accuracy measurement of optical frequency modulation or optical phase modulation of a laser light source useful for optical sensing and the like. Optical angle modulation is a generic term for the optical frequency modulation and the optical phase modulation.

BACKGROUND ART

Semiconductor lasers having emission wavelengths in the near infrared region are widely used not only as light sources for large-capacity optical fiber communication systems but also as various light sources for optical sensing. The intensity and frequency of the output light of the semiconductor laser can be modulated by modulating the injection current, so the semiconductor lasers are used in various high-sensitivity sensing systems in combination with heterodyne or homodyne detection. In addition, a method of phase modulation of the output light with a phase modulator placed outside the laser is also widely used to achieve high sensitivity and high functionality of the optical sensing system.

A laser imaging detection and ranging (lidar) is mentioned as an example of a high sensitivity sensing system using direct modulation of optical frequency. FIG. 9 is a diagram for showing the principle of a frequency modulated continuous wave (FMCW) lidar which is a typical system. The principle will be described below. The optical frequency of a laser 1 is modulated using a signal generator 2 which generates a triangular wave. In the case of semiconductor laser, the optical frequency can be directly modulated by an injection current. The output light of the laser 1 is divided into two: one as signal light and the other as local light. The signal light is applied to a measuring object 11, and the signal light, which is reflected and returned, and the local light are combined and input to the photodetector 4 to detect a beat signal. The optical frequency modulated by the triangular wave periodically repeats up-chirp and down-chirp. Since a time difference occurs between the signal light, which is reflected and returned, and the local light, and the optical frequency is chirped, a beat signal having a frequency proportional to the time difference (see a beat signal waveform 12) is generated at the output of the photodetector 4. Therefore, by measuring the beat signal frequency, it is possible to know the time difference, that is, the distance to the measuring object 11. The use of both up-chirp and down-chirp is to obtain the velocity from the Doppler shift in a case where the measuring object 11 is in motion.

From the beat signal frequency $f_B$ measured by the FMCW lidar, the distance L to the measuring object 11 can be calculated by the following expression.

$$L = \frac{cf_B}{2} \bigg/ \frac{2\Delta f}{T_m} \quad (1)$$

Here, c is the speed of light, $\Delta f$ is the chirp bandwidth, and $T_m$ is the modulation period. In Expression (1), $2\Delta f/T_m$ represents a frequency change per unit time, that is, a chirp rate. In order to calculate the distance from the beat signal frequency, it is necessary to obtain the chirp rate in advance.

FIG. 10 is a diagram showing the principle of an FM chirp pulse compression lidar. The principle will be described below. Similar to the FMCW lidar, the optical frequency of the signal light laser 1a is modulated by a triangular wave using the signal generator 2. Local light is generated using a non-modulated local laser 1b. The light reflected by the measuring object 11 and returned is combined with the local light and is input to the photodetector 4a to detect a beat signal. Unlike the case of the FMCW lidar, the optical frequency of the local light is not modulated, so the beat signal becomes a chirp signal whose frequency changes with time (see the beat signal waveform 12 in FIG. 10). By inputting the output of the photodetector 4a to the matched filter 13, and converting the chirp signal into pulses (see the matched filter output waveform 15 in FIG. 10), it is possible to obtain the distance to the measuring object 11 from the time of pulse generation. The impulse response 14 of the matched filter 13 has a time-reversed waveform of the chirped beat signal, and has a function of compressing the chirp signal to generate a pulse. The up-chirp and down-chirp are used to obtain the velocity. Since the FM chirp pulse compression lidar uses two independent lasers for the generation of signal light and local light, it is necessary to keep the average frequency between them constant. Therefore, the average frequency is monitored using the photodetector 4b for beat frequency control, and the output of the photodetector 4b is fed back to the local laser 1b to perform frequency control.

The distance resolution R in the FMCW lidar and the FM chirp pulse compression lidar can be expressed by the following expression.

$$R = \frac{c}{2\Delta f} \quad (2)$$

Here, c is the speed of light, and $\Delta f$ is the chirp bandwidth. Since the distance resolution is inversely proportional to the chirp bandwidth, a large chirp bandwidth is required to obtain high resolution. For example, the chirp bandwidths required to obtain resolutions 10 cm and 1 cm are 1.5 GHz and 15 GHz, respectively. In addition to the chirp bandwidth, the linearity of the chirp is also important. In distance measurement by the lidar, the fact that the optical frequency increases (up-chirp) or decreases (down-chirp) in proportion to time is used, but in a case where the chirp is nonlinear with respect to time, the beat frequency changes irregularly and produces an error in distance estimation. In a semiconductor laser directly modulated by injection current, it is known that a nonlinear chirp appears notably, and the main cause thereof is the frequency response characteristics of the laser device and the driving circuit.

An optical gyroscope and lidar velocimeter using serrodyne modulation are typical examples of high-sensitivity sensing based on external phase modulation. In serrodyne modulation using a phase modulator placed outside the laser, a frequency shift corresponding to the phase modulation frequency is given to the transmitted light by sawtooth wave modulation with phase deviation $2\pi$. In order to realize serrodyne modulation, it is required that the optical phase linearly increases in proportion to time and that the phase shift is exactly $2\pi$. However, due to the frequency response characteristics of the phase modulator and the driving circuit, it is known that the optical phase modulation waveform is degraded.

As is apparent from the examples of the two lidar systems and serrodyne modulation described above, in a sensing system using direct frequency modulation or external phase modulation, performance such as resolution and accuracy largely depends on modulation characteristics. In order to obtain the desired sensing performance, it is necessary to minimize the influence of the modulation characteristics by understanding the modulation characteristics of the laser light source and the phase modulator and appropriately designing the driving circuit. In order to understand the modulation characteristics, a technique is required which is capable of accurately measuring the temporal waveform or spectrum of optical frequency modulation or optical phase modulation.

The laser light in 1550 nm wavelength band used for optical fiber communication has an optical frequency of about 193 THz. It is difficult to convert electromagnetic wave having such an extremely high frequency directly into an electrical signal and use it for measurement. In order to measure the temporal waveform of optical angle modulation, it is necessary to convert the optical signal into a signal in an electrically processable frequency band. By inputting a modulated laser light to an optical system whose transmittance or reflectance depends on the optical frequency or optical phase, it is possible to measure the temporal waveform of optical angle modulation from the intensity change of the transmitted light or the reflected light. FIG. 11 shows an optical angle modulation measurement apparatus using optical angle-to-intensity conversion by a Mach-Zehnder interferometer in the related art. For example, in the Mach-Zehnder interferometer shown in FIG. 11, the output light intensity of the interferometer shows a sinusoidal change with respect to the frequency and phase of the incident light. It is possible to measure the temporal waveform of optical angle modulation by utilizing a portion where the output light intensity changes linearly with respect to the frequency or phase of incident light (Non-Patent Document 1). The output of the laser 1 modulated by using the signal generator 2 is divided into two by the optical directional coupler 7a. One light is delayed by time $\tau_d$ by the optical delay medium 9, and then is combined with the other light by the optical directional coupler 7b, and the combined light is received by the photodetector 4. As the optical delay medium 9, an optical path in space or an optical fiber can be used. As shown in FIG. 11, when the phase difference between the two optical paths in the Mach-Zehnder interferometer is set to be $\pi/2$, an electrical signal approximately proportional to the change in the optical frequency or the optical phase appears in the output of the light detector 4, and the temporal waveform of the optical angle modulation can be measured by using the temporal waveform analyzer 6.

The inventor has proposed frequency noise measurement apparatus and measurement method using a delayed self-heterodyne method (see Patent Document 1). FIG. 12 is a diagram showing an optical frequency noise measurement apparatus using a delayed self-heterodyne method in the related art. As shown in FIG. 12, the output light of the laser 1 which is to be measured is input to the heterodyne interferometer 3, and the output light of the heterodyne interferometer 3 is received by the photodetector 4. The beat signal output from the photodetector 4 is input to the vector signal analyzer 16, and is frequency demodulated to obtain the power spectral density of the frequency noise. Furthermore, by using the signal processing apparatus 17, the frequency noise power spectral density of the laser light to be measured is obtained by multiplying the power spectral density of the beat signal by $[2(1-\cos(2\pi f \tau_d))]^{-1}$ (where f is a Fourier frequency and $\tau_d$ is a delay time in the heterodyne interferometer). As an example of the heterodyne interferometer 3, a Mach-Zehnder interferometer can be used which includes an optical frequency shifter whose frequency shift is $f_S$ in one optical path and an optical fiber whose delay time is $\tau_d$ in the other optical path. The delay time td of the heterodyne interferometer 3 depends on the desired Fourier frequency range. When performing wide band measurement, power spectral densities for different Fourier frequency ranges are obtained by changing the delay time $\tau_d$. Further, a measurement method using a delayed self-homodyne method without using an optical frequency shifter has been reported (Non-Patent Document 2), and the measurement principle is the same as that of the delayed self-heterodyne method.

Methods of controlling optical frequency modulation using the heterodyne interferometer similar to that of Patent Document 1 have also been reported (Non-Patent Documents 3, 4). Specifically, it is as follows. A frequency-modulated laser light is input to an interferometer to generate a beat signal, and a digital phase and frequency detector is used to detect the phase difference between the beat signal and the reference signal. The frequency of the reference signal is set to a desired value, and negative feedback control of the laser light source is performed such that the detected phase difference becomes zero. This enables to compensate for nonlinear chirp in optical frequency modulation.

CITATION LIST

Patent Literature

[Patent Document 1] Japanese Unexamined Patent Application, First Publication No. 2012-088174

Non-Patent Literature

[Non-Patent Document 1] W. V. Sorin et al., "Frequency domain analysis of an optical FM discriminator," J. Lightwave Technol., vol. 10, no. 6, pp. 787-793 (1992)

[Non-Patent Document 2] T. N. Huynh et al., "Delayed self-heterodyne phase noise measurements with coherent phase modulation detection," IEEE Phton. Technol. Lett., vol. 24, no. 4, pp. 249-251 (2012)

[Non-Patent Document 3] P. A. Roos et al., "Ultrabroadband optical chirp linearization for precision metrology applications," Opt. Lett., vol. 34, no. 23, pp. 3692-3694 (2009)

[Non-Patent Document 4] W. Xie et al., "Fourier transform-limited optical frequency-modulated continuous-wave interferometry over several tens of laser coherence length" Opt. Lett., vol. 41, no. 13, pp. 2962-2965 (2016)

SUMMARY OF INVENTION

Technical Problem

An optical angle modulation measurement apparatus of Non-Patent Document 1 has the following problems. First, the temporal waveform of optical angle modulation measured using the optical angle modulation measurement apparatus shown in FIG. 11 will be described using expressions. Here, although the case of optical frequency modulation will be described, the same applies to optical phase modulation.

The electric field of the output light of the laser 1 which is to be measured is expressed by the following expression.

$$E(t)=E_0 \exp[i\{2\pi v_0 t+\phi(t)\}] \quad (3)$$

In expression (3), $E_0$ represents the amplitude of the electric field, $v_0$ represents the center frequency, and the amplitude is constant. $\varphi(t)$ is an instantaneous phase, and represents optical phase modulation. The optical frequency modulation v(t) is related to the instantaneous phase $\varphi(t)$ by the following expression.

$$v(t) = \frac{1}{2\pi}\frac{d\phi(t)}{dt} \quad (4)$$

The delay time between two optical paths in the Mach-Zehnder interferometer is denoted by $\tau_d$. Under the condition that the phase difference between the two optical paths is $\pi/2$, that is, $2\pi v_0\tau_d=\pi/2$, and the phase change during delay time $\tau_d$ is small, the intensity of the light received by the photodetector 4 can be expressed by the following expression.

$$I(t) = \frac{E_0^2}{2}[1 - \sin\{\phi(t) - \phi(t - \tau_d)\}] \approx \frac{E_0^2}{2}[1 - \{\phi(t) - \phi(t - \tau_d)\}] \quad (5)$$

In a case where the delay time Td is negligibly small compared with the time of phase change caused by modulation, the alternating current signal output from the photodetector 4 can be expressed by the following expression.

$$V_{PD} = -\xi\{\phi(t) - \phi(t - \tau_d)\} \approx -\xi\tau_d \frac{\phi(t)}{dt} = -2\pi\xi\tau_d v(t) \quad (6)$$

In Expression (6), 4 is a constant determined by the characteristics of the Mach-Zehnder interferometer and the sensitivity of the photodetector 4. Expression (6) expresses that the alternating current signal of the output of the photodetector 4 is proportional to the optical frequency modulation v(t), and suggests that the temporal waveform of the optical frequency modulation can be measured from the alternating current signal of the output of the photodetector 4.

Although the example using the Mach-Zehnder interferometer has been described above, similar measurement may be applied to a medium such as a Fabry-Perot interferometer or an atomic and molecular absorption line whose transmittance or reflectance depends on an optical frequency or an optical phase. A method using optical angle-to-intensity conversion by an interferometer is used to measure a temporal waveform in optical angle modulation of laser, but has the following problems.

The first problem relates to the effect of light intensity modulation. In the process of deriving Expression (6), the amplitude of the laser light to be measured is made constant. However, in the semiconductor laser directly modulated by the injection current, in addition to the optical frequency, the light intensity is also modulated at the same time, so a component resulting from the light intensity modulation appears at the output of the photodetector 4. At the output of the photodetector 4, it is difficult to separate the components of light intensity modulation and optical frequency modulation, which becomes a major error factor of optical angle modulation measurement.

The second problem relates to the calibration of the conversion coefficient from optical frequency or optical phase to light intensity in the optical system. As Expression (6) shows, the alternating current signal of the output of the photodetector 4 is proportional to the optical frequency modulation of the laser light to be measured, but the conversion coefficient depends on the characteristics of the interferometer and on the sensitivity of the photodetector 4, so it is necessary to calibrate the conversion coefficient prior to measurement. When the optical frequency of the laser light is swept and the output light intensity of the photodetector 4 is measured, the conversion coefficient can be calibrated, but it is necessary to accurately know the change in the optical frequency when the laser light is swept. Although it is possible to estimate the proportional coefficient from the physical length of the interferometer, in a case where the interferometer is made of optical fiber, glass, or the like, it is necessary to consider the refractive index for the wavelength of the incident light, which makes the procedure complicated. Further, the transmission property of the interferometer is inherently nonlinear and causes an error in measuring the linearity of the chirp.

The third problem relates to the stability of the optical path length of the optical delay medium 9 and the interferometer. In the case of the Mach-Zehnder interferometer, it is necessary to set the phase difference between the two optical paths to $\pi/2$. The phase difference depends on the center frequency of the incident light and the delay time, that is, the physical length of the interferometer. Since these physical quantities easily change due to disturbance or the like, it is generally difficult to keep the phase difference stable within the measurement time. Therefore, as shown in FIG. 11, it is necessary to feed back a part of the output signal of the photodetector 4 to the optical delay medium 9 and perform control such that the phase difference becomes $\pi/2$.

As described above, although the case of optical frequency modulation has been explained, the same problem resides in the case of application to optical phase modulation.

The optical frequency noise measurement apparatus of Patent Document 1 has the following problems. First, measurement using the optical frequency noise measurement apparatus shown in FIG. 12 will be described using expressions. The electric field of the output light of the laser 1 which is to be measured is expressed by Expression (3). As described in Patent Document 1, in a case where the Mach-Zehnder heterodyne interferometer is used, the frequency of the beat signal output from the photodetector 4 can be expressed by the following expression.

$$f_B(t)=f_S+v(t)-v(t-\tau_d) \quad (7)$$

The first term in Expression (7) is a constant, and represents the frequency shift given by the optical frequency shifter. The vector signal analyzer 16 detects the second term and the third term after subtracting the frequency shift $f_S$ in Expression (7), which are components resulting from the optical frequency noise and is expressed by $\mu(t)$.

$$\mu(t)=v(t)-v(t-\tau_d) \quad (8)$$

Here, v(t) is the frequency noise of the laser light to be measured, and in Expression (8), $\mu(t)$ represents the difference of the frequency noise of the laser light to be measured at time t and time $t-\tau_d$.

In the optical frequency noise measurement apparatus of Patent Document 1, the vector signal analyzer 16 is used to calculate a power spectral density represented by the following expression.

$$S_\mu(f)=2\{1-\cos(2\pi f\tau_d)\}S_v(f) \quad (9)$$

Further, the signal processing apparatus 17 is used to obtain the frequency noise power spectral density $S_v(f)$ of the laser light to be measured by multiplying the power spectral density of the beat signal of Expression (9) by $[2(1-\cos(2\pi f\tau_d))]^{-1}$.

In the frequency noise measurement apparatus and measurement method of Patent Document 1, the three problems of the light angle modulation measurement apparatus of Non-Patent Document 1 are solved, which enables measurement of frequency noise power spectral density of laser light to be measured.

However, the frequency noise measurement apparatus and measurement method of Patent Document 1 is essentially frequency domain measurement techniques for the purpose of measuring the power spectral density of optical frequency noise. In order to evaluate the optical angle modulation characteristics, that is, the chirp bandwidth and linearity, which are important parameters in the light sensing system, it is necessary to measure the temporal waveform, not the power spectral density. In the frequency noise measurement apparatus and measurement method of Patent Document 1, it is possible to detect the optical frequency difference $\mu(t)$ represented by Expression (8), but optical frequency modulation temporal waveform v(t) and optical phase modulation temporal waveform $\varphi(t)$ cannot be obtained.

In the digital phase and frequency detectors described in Non-Patent Documents 3, 4, a signal proportional to the phase difference between the optical frequency difference (t) and the reference signal is obtained. Since the detection range of the phase difference is limited to the range of $-2\pi$ to $+2\pi$, it is not possible to measure the optical frequency modulation temporal waveform v(t) and the optical phase modulation temporal waveform $\varphi(t)$.

The present invention is made to solve the above-described problems in laser optical angle modulation measurement, and an object thereof is to provide an apparatus and a method capable of measuring a temporal waveform of optical angle modulation, without being affected by light intensity modulation, without necessity of calibration, without performing stabilization of an interferometer, in laser optical angle modulation measurement by a delayed self-heterodyne method.

Solution to Problem

The present invention has the following features to achieve the above object.

An apparatus according to the present invention is a optical angle modulation measurement apparatus by a delayed self-heterodyne method, including a heterodyne interferometer that is fed with laser light to be measured which is optical-angle modulated by a signal generator, a photodetector which is configured to receive output light of the heterodyne interferometer to perform heterodyne detection; a phase demodulator that is configured to demodulate a phase of a beat signal output from the photodetector, and a temporal waveform analyzer that is configured to obtain a temporal waveform of optical angle modulation, from the phase of the beat signal.

In the optical angle modulation measurement apparatus, specifically, the temporal waveform of the optical angle modulation is a temporal waveform of at least one of optical frequency modulation and optical phase modulation.

In the optical angle modulation measurement apparatus, in a case where the optical angle modulation is the optical frequency modulation, the time waveform analyzer is configured to obtain the temporal waveform of the optical frequency modulation of the laser light to be measured by multiplying the phase of the beat signal by $[2\pi\tau_d]^{-1}$ (where, $\tau_d$ is a delay time in the heterodyne interferometer).

In the optical angle modulation measurement apparatus, in a case where the optical angle modulation is the optical phase modulation, the temporal waveform analyzer is configured to obtain the temporal waveform of the optical phase modulation of the laser light to be measured by multiplying the phase of the beat signal by $[2\pi\tau_d]^{-1}$ (where, $\tau_d$ is a delay time in the heterodyne interferometer) and integrating the value with respect to time. In the optical angle modulation measurement apparatus, it is desirable that the delay time in the heterodyne interferometer is set to a negligibly small value, as compared with a time taken for an optical frequency or an optical phase change of the laser light to be measured.

In the optical angle modulation measurement apparatus, for example, the heterodyne interferometer is a Mach-Zehnder interferometer including a first optical directional coupler that bifurcates the input laser light to be measured, a first optical path in which an optical frequency shifter of frequency shift $f_S$ is disposed, a second optical path having an optical delay medium with a delay time $\tau_d$, and a second optical directional coupler that combines an output of the first optical path and an output of the second optical path, and the output light of the heterodyne interferometer is output light of the second optical directional coupler.

In the optical angle modulation measurement apparatus, for example, the heterodyne interferometer is a Mach-Zehnder interferometer including an optical frequency shifter of frequency shift $f_S$ which is fed with the laser light to be measured, an optical delay medium with a delay time Td, and an optical directional coupler, inputting zeroth order diffracted light of the optical frequency shifter to the optical delay medium, and combining and outputting first order diffracted light of the optical frequency shifter and output light of the optical delay medium by the optical directional coupler, and the output light of the heterodyne interferometer is output light of the optical directional coupler.

A method of the present invention is a optical angle modulation measurement method by a delayed self-heterodyne method, including inputting laser light to be measured which is optical-angle modulated, to a heterodyne interferometer, receiving output light of the heterodyne interferometer and performing heterodyne detection of the output light, by a photodetector, and obtaining the temporal waveform of optical angle modulation by demodulating a phase of the beat signal output from the photodetector.

In the optical angle modulation measurement method, in a case where the optical angle modulation is the optical frequency modulation, the temporal waveform of the optical frequency modulation of the laser light to be measured is obtained by multiplying the phase of the beat signal by $[2\pi n\tau_d]^{-1}$ (where, $\tau_d$ is a delay time in the heterodyne interferometer). In the optical angle modulation measurement method, in a case where the optical angle modulation is the optical phase modulation, the temporal waveform of the optical phase modulation of the laser light to be measured is obtained, by multiplying the phase of the beat signal by $[2\pi\tau_d]^{-1}$ (where, $\tau_d$ is a delay time in the heterodyne interferometer) and integrating the value with respect to time.

In the optical angle modulation measurement method, it is desirable that the delay time in the heterodyne interferometer is set to a negligibly small value, as compared with a time taken for an optical frequency or an optical phase change of the laser light to be measured.

Advantageous Effects of Invention

In the optical angle modulation measurement apparatus of the present invention, in an optical angle modulation measurement apparatus by a delayed self-heterodyne method, a heterodyne interferometer that is fed with laser light to be measured which is optical-angle modulated by a signal generator, a light detector which that is configured to receive output light of the heterodyne interferometer to perform heterodyne detection, a phase demodulator that is configured to demodulate a phase of a beat signal output from the photodetector, and a time waveform analyzer that is configured to obtain a temporal waveform of optical angle modulation, from the phase of the beat signal are provided, so it is possible to accurately measure the temporal waveform of optical angle modulation.

In the optical angle modulation measurement method of the present invention, by using a delayed self-heterodyne method, laser light to be measured which is optical-angle modulated is input to a heterodyne interferometer, output light of the heterodyne interferometer is received and heterodyne detection of the output light is performed, by a photodetector, and a temporal waveform of optical angle modulation is obtained by demodulating a phase of the beat signal output from the photodetector, so it is possible to accurately measure the temporal waveform of optical angle modulation.

Further, in the apparatus and method of the present invention, the phase of the beat signal generated by the heterodyne interferometer is measured, so it is not affected by light intensity modulation. Therefore, the apparatus and method are applicable to the semiconductor laser light source directly modulated by injection current. Further, according to the apparatus and method of the present invention, calibration of light angle and intensity conversion is unnecessary, and a complicated procedure is not required. Further, in the apparatus and method of the present invention, the beat signal which is an alternating current signal is detected, so stabilization of the optical path length of the interferometer is unnecessary, and the apparatus can be simplified.

In the apparatus and method of the present invention, the phase of the beat signal is detected by phase demodulation by using the delayed self-heterodyne method, so it is possible to obtain the temporal waveform of the optical angle modulation. In the frequency noise measurement technique of Patent Document 1 in the related art, the delay time $\tau_d$ is set according to the desired Fourier frequency range, and the frequency difference during td is detected. On the other hand, in the optical angle modulation measurement apparatus and measurement method of the present invention, if the delay time $\tau_d$ is set to a negligibly small value, as compared with a time scale of an optical frequency change, the phase difference during $\tau_d$ is detected, and the temporal waveforms of the optical frequency modulation and the optical phase modulation can be calculated by using the approximate relationship between the phase difference and the frequency. Therefore, it becomes possible to measure the temporal waveform which is difficult in the frequency noise measurement technique of Patent Document 1. Further in the optical angle modulation measurement apparatus and measurement method of the present invention, the beat signal can be demodulated in analog domain, and the phase difference can be detected, so it becomes possible to measure the temporal waveform which is difficult in Non-Patent Documents 3 and 4.

DESCRIPTION OF EMBODIMENTS

Figure 1:
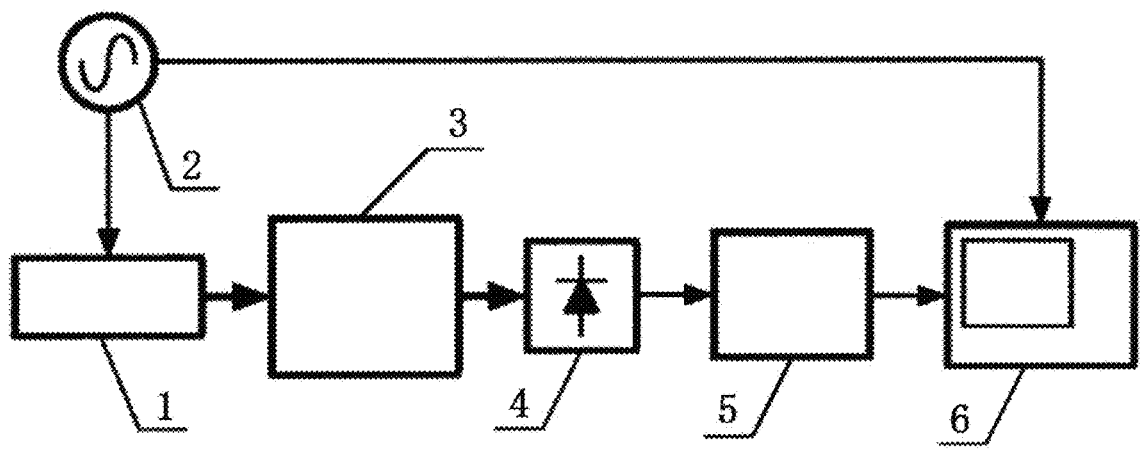
FIG. 1 is a diagram showing an optical angle modulation measurement apparatus according to the present invention.

Hereinafter, embodiments of the present invention will be described in detail. In the present invention, the temporal waveform of optical angle modulation is measured by the delayed self-heterodyne method, using a heterodyne interferometer, a photodetector, a phase demodulator, and a temporal waveform analyzer. FIG. 1 is a diagram showing an optical angle modulation measurement apparatus according to the present invention. As shown in FIG. 1, the output light of the laser 1 which is the laser light to be measured which is optical-angle modulated by the signal generator 2 is input to the heterodyne interferometer 3. The photodetector 4 receives the output light from the heterodyne interferometer 3 and performs heterodyne detection of the output light to output a beat signal. The beat signal which is the output signal of the photodetector 4 is input to the phase demodulator 5, the instantaneous phase of the beat signal is detected, and the temporal waveform analyzer 6 is used to obtain the temporal waveform of the optical angle modulation of the laser light to be measured.

First Embodiment

Figure 2:
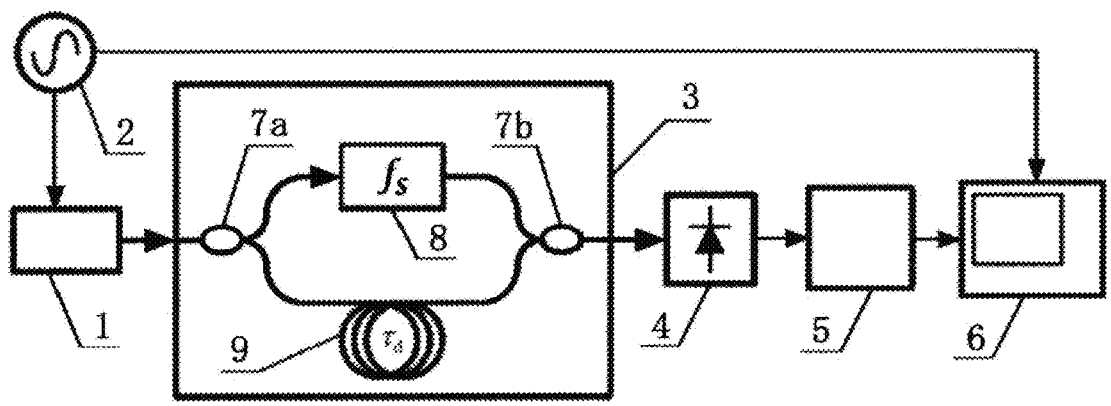
FIG. 2 is a diagram showing an optical angle modulation measurement apparatus according to a first embodiment.

A first embodiment will be described below with reference to FIGS. 1 and 2. In the first embodiment, in an optical angle modulation measurement apparatus of FIG. 1, a Mach-Zehnder interferometer is used as the heterodyne interferometer 3. FIG. 2 is a diagram showing the first embodiment. The output light of the laser 1, which is the laser light to be measured which is optical-angle modulated by the signal generator 2, is branched into two by the optical directional coupler 7a. One is input to the optical frequency shifter 8 and the other is input to the optical delay medium 9. The light subjected to the frequency shift of $f_S$ by the optical frequency shifter 8 and the light delayed by time $\tau_d$ by the optical delay medium 9 are combined by the optical directional coupler 7b and output.

An acousto-optic modulator can be used as the optical frequency shifter 8. In the acousto-optic modulator, the frequency shift of the diffracted light to be output is selected as either positive (up shift) or negative (down shift), by adjusting the angle of the incident light with respect to the traveling direction of the acoustic wave. Since the optical frequency modulation measurement does not depend on the direction of shift, the case of upshift will be described here.

Hereinafter, the beat signal output from the photodetector 4 will be described using expressions, with the case of the Mach-Zehnder interferometer as an example. The case described later as the second embodiment is basically the same as the case of the Mach-Zehnder interferometer.

The electric field of the output light of the laser 1 which is the laser light to be measured is expressed by Expression (3). The signal output from the light detector 4 of FIG. 2 can be expressed by the following expression.

$$V_{PD}(t) = \frac{\xi E_0^2}{2}[1 + \cos\{2\pi f_S t - 2\pi v_0 \tau_d + \phi(t) - \phi(t-\tau_d)\}] \quad (10)$$

Here, $\xi$ is a constant determined by the sensitivity of the photodetector 4. The first term in the parentheses of Expression (10) corresponds to a DC component, and the second term corresponds to a beat signal of frequency $f_S$. The phase $\varphi_B(t)$ of the beat signal detected by the phase demodulator 5 is obtained from Expression (10) as the following expression.

$$\varphi_B(t) = -2\pi v_0 \tau_d + \phi(t) - \phi(t-\tau_d) \quad (11)$$

The first term of Expression (11) is a constant, and the second and third terms are caused by the optical angle modulation of the laser 1 to be measured. The phase demodulator 5 is used to obtain the phase $\varphi_B(t)$ from the output signal of the photodetector 4 expressed by Expression (10). As the phase demodulator, for example, an analog demodulator having a phase unwrapping function can be used. In the case of using the analog demodulator, phase detection of any magnitude not limited to the range of $-2\pi$ to $+2\pi$ is possible.

In a case where the delay time $\tau_d$ is set to a negligibly small value, as compared with a time taken for an optical frequency or optical phase change, the time derivative of the phase can be approximated by the following expression.

$$\frac{d\phi(t)}{dt} \approx \frac{\phi(t) - \phi(t-\tau_d)}{\tau_d} \quad (12)$$

Since the time derivative of the phase and the instantaneous frequency are related by Expression (4), the phase of the beat signal can be expressed by the following expression.

$$\phi_B(t) \approx -2\pi v_0 \tau_d + \tau_d \frac{d\phi(t)}{dt} = -2\pi v_0 \tau_d + 2\pi v(t)\tau_d \quad (13)$$

Here, v(t) represents optical frequency modulation. The first term in the middle and right sides of Expression (13) represents a DC component determined by the center frequency of the laser to be measured and the delay time, and the second term represents an alternating current component resulting from the optical frequency modulation. Since the left side and the right side of Expression (13) are almost equal, it can be understood that the optical frequency modulation v(t) is obtained from the relationship between the phase $\varphi_B(t)$ of the beat signal on the left side and the optical frequency modulation v(t) of the second term on the right side. Therefore, in the present embodiment, Expression (13) is multiplied by $[2\pi\tau_d]^{-1}$ after removing the DC component of the first term using the time waveform analyzer 6 to obtain the temporal waveform of the optical frequency modulation of the laser to be measured.

The procedure in the case of obtaining the temporal waveform of the optical phase modulation is as follows. Since the optical frequency modulation v(t) and the instantaneous phase $\varphi(t)$ are related by Expression (4), the temporal waveform of the optical frequency modulation obtained by Expression (13) can be converted into a time waveform of optical phase modulation using the following expression.

$$\phi(t) = \frac{1}{\tau_d}\int_0^t \{\phi_B(t') + 2\pi v_0 \tau_d\}dt' \quad (14)$$

A series of processes for obtaining the temporal waveform of the optical frequency or the optical phase from the output of the phase demodulator 5 is performed using the temporal waveform analyzer 6.

In the optical angle modulation measurement apparatus and method of the present embodiment, the phase of the beat signal obtained by the delayed self-heterodyne method is demodulated to perform measurement, so it is not affected by the light intensity modulation. In addition, since the temporal waveform of optical frequency modulation is obtained in relation to the phase of the beat signal, calibration is not necessary. Further, since the beat signal is measured by heterodyne detection, stabilization of the interferometer is not necessary.

In the optical angle modulation measurement apparatus and method of the present embodiment, the delay time $\tau_d$ is set to be negligibly small, as compared with a time taken for an optical frequency or optical phase change, and the phase of the beat signal is measured by analog demodulation, so a temporal waveform can be observed. In a case where power spectral densities of optical frequency or optical phase modulation are required, it can be obtained from the temporal waveform by Fourier transform.

Second Embodiment

Figure 3:
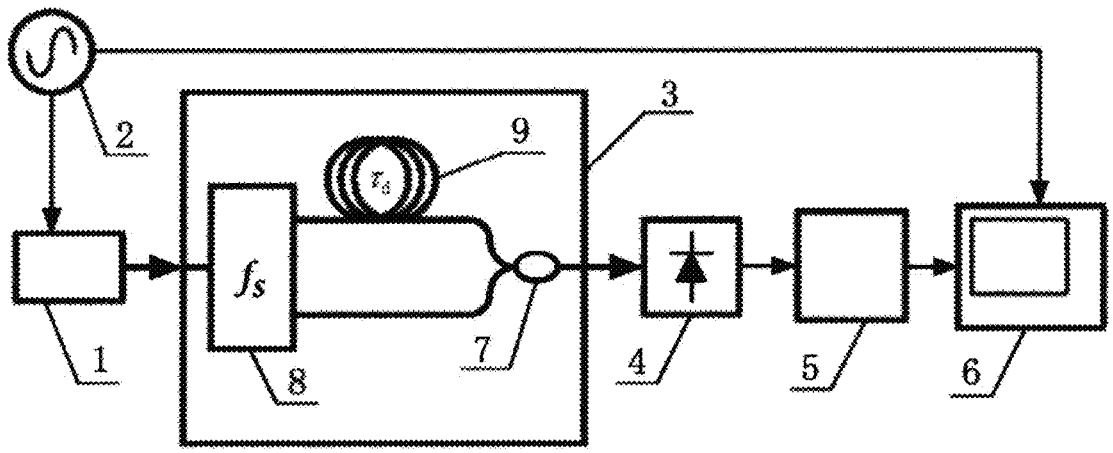
FIG. 3 is a diagram showing an optical angle modulation measurement apparatus according to a second embodiment.

A second embodiment will be described below with reference to FIG. 1, and FIGS. 3 to 8. In the second embodiment, in an optical angle modulation measurement apparatus of FIG. 1, a Mach-Zehnder interferometer is used as the heterodyne interferometer 3. FIG. 3 is a diagram showing the second embodiment. The output light of the laser 1 which is the laser light to be measured whose optical angle is modulated by the signal generator 2 is input to the optical frequency shifter 8 of the frequency shift $f_S$. The optical frequency shifter 8 simultaneously outputs zeroth-order diffracted light not subjected to frequency shift and first-order diffracted light subjected to frequency shift of $f_S$. The zeroth-order diffracted light delayed by time $\tau_d$ by the optical delay medium 9 and the first-order diffracted light are combined and output by the optical directional coupler 7, and are received by the photodetector 4. The configuration after the photodetector 4 is the same as that of the first embodiment. The operation is the same even in a case where the optical delay medium 9 is disposed in the optical path of the first-order diffracted light. In order to increase the amplitude of the beat signal, it is desirable to reduce the difference in intensity between the zeroth-order diffracted light and the first-order diffracted light, and the positions to dispose the optical delay medium 9 may be determined in consideration of the respective intensities of the diffracted light and the insertion loss of the optical delay medium 9.

As compared with the Mach-Zehnder interferometer according to the first embodiment, the Mach-Zehnder interferometer according to the second embodiment is characterized in that it does not require an optical directional coupler that is fed with laser light to be measured and branches the input laser light to be measured into two. Therefore, the apparatus is simplified, and zeroth-order diffracted light not used in the first embodiment can be effectively used.

<Example of Optical Frequency Modulation Measurement>

An example of optical frequency modulation measurement performed using the apparatus of the second embodiment will be described. Although an example of the second embodiment is shown here, the same can be applied to the first embodiment.

A semiconductor laser with a wavelength of 1552.1 nm and an output of 5 mW is used as the laser light to be measured. The laser light to be measured is driven by a dedicated temperature and injection current controller, and is subjected to frequency modulation by using the signal generator 2 and the current modulation functions of the controller. The heterodyne interferometer 3 is configured using the optical frequency shifter 8 having a frequency shift of 500 MHz, the optical fiber having a length of 2 m (delay time 10 ns) as the optical delay medium 9, and the optical directional coupler 7. The output light of the heterodyne interferometer 3 is input to the photodetector 4 with the response band of 40 kHz to 800 MHz. After the beat signal output from the photodetector 4 is input to a wide band digitizer (resolution 12 bit, sampling rate 2 GS/s, and analog bandwidth 1 GHz) and recorded, analog phase demodulation and temporal waveform calculation are performed by software processing.

Figure 4:
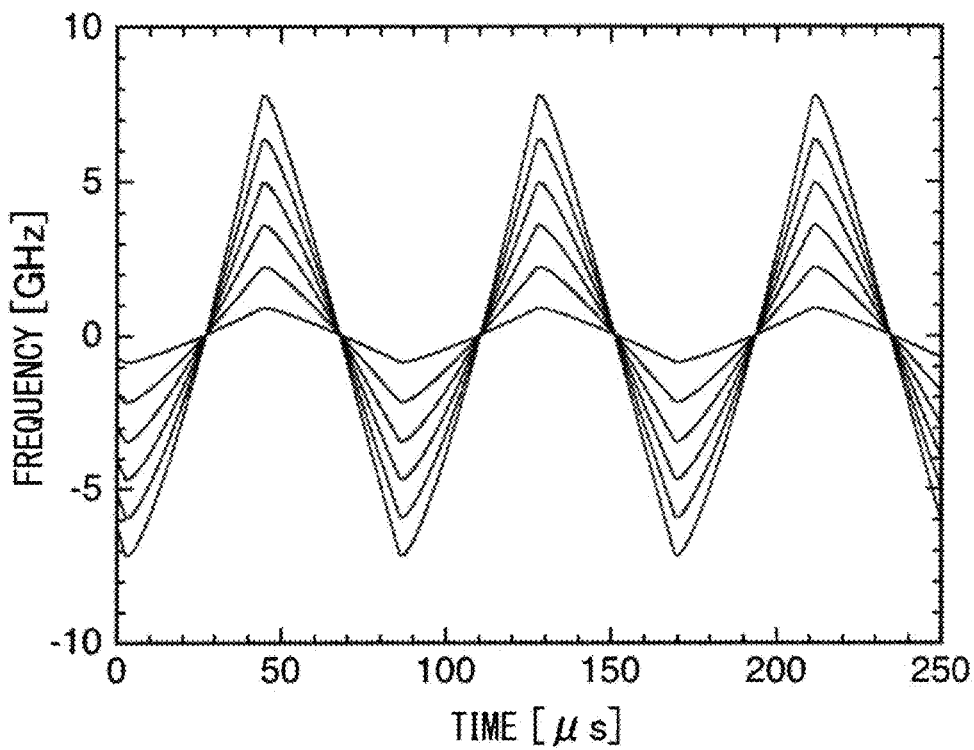
FIG. 4 is a diagram showing a temporal waveform in the case of performing optical frequency modulation with a triangular wave signal in the second embodiment.

FIG. 4 is a diagram showing a temporal waveform in the case of performing optical frequency modulation with a triangular wave signal. In FIG. 4, the modulation frequency is 12 kHz, and the modulation current amplitudes are 8, 20, 32, 44, 56, and 68 mA$_{pp}$, respectively. It can be seen that the waveform is close to the triangular wave signal applied to the injection current of the laser. Since the frequency modulation by the triangular wave is a modulation format used in the FMCW lidar and the FM chirp pulse compression lidar, the performance of the sensing system such as the lidar is improved by accurately measuring the temporal waveform of the optical angle modulation by the triangular wave signal.

Figure 5:
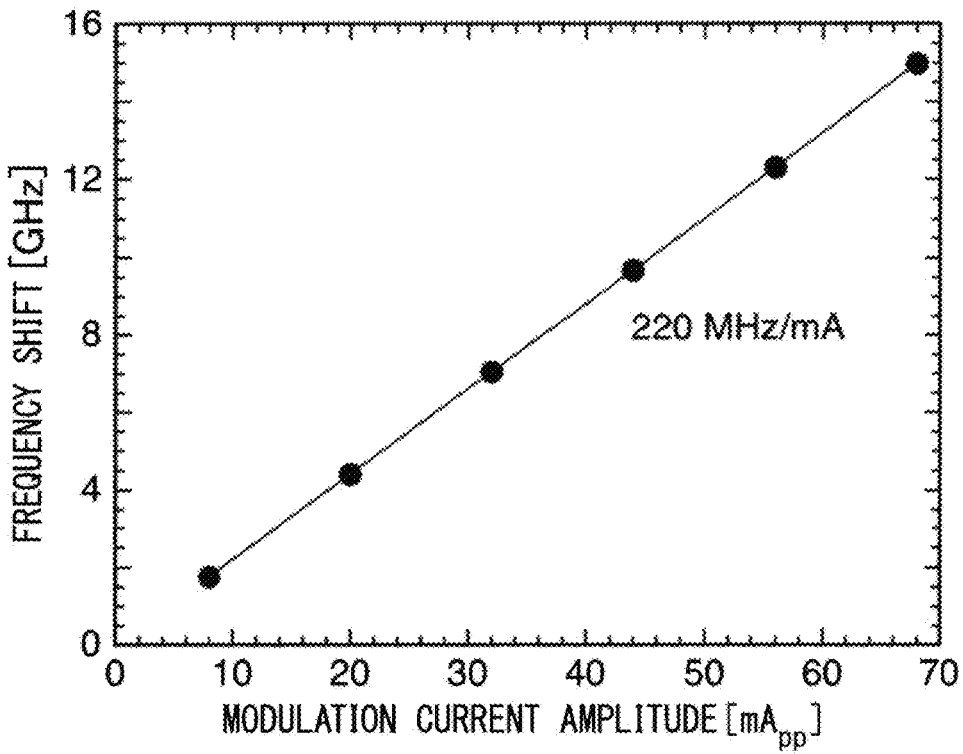
FIG. 5 is a diagram showing the relationship between modulation current amplitude and frequency shift in the second embodiment.

FIG. 5 is a diagram showing the relationship between modulation current amplitude and frequency shift. In proportion to the modulation current amplitude, the frequency shift is increasing at a rate of 220 MHz/mA. At a modulation current amplitude of 68 mA$_{pp}$, the frequency shift is increased to 15.0 GHz, which is the chirp bandwidth required to obtain 1 cm resolution in an FMCW and an FM chirp pulse compression lidar. The phase change of the beat signal at this time is 308π rad, and it can be seen that the phase unwrapping in the analog demodulation functions effectively.

In the optical angle modulation measurement apparatus and method of the present embodiment, the phase change occurring during the delay time of the heterodyne interferometer 3 is detected. As shown in Expression (12) and Expression (13), the phase change per unit time corresponds to the optical frequency, so it becomes possible to measure a larger frequency change, by reducing the delay time. For example, if the length of the optical fiber used for the heterodyne interferometer 3 is set to 0.2 m (delay time 1 ns), which is 1/10 of the present apparatus, measurement of a frequency shift of 150 GHz or more becomes possible.

In the distance measurement by the lidar, it is assumed that the optical frequency increases (up-chirp) or decreases (down-chirp) in proportion to time. However, in a case where the frequency change over time is nonlinear, the beat frequency which is to be a constant value changes, which causes an error in distance calculation. In particular, it is known that, in a direct frequency modulated semiconductor laser, nonlinear chirp is generated because the frequency response to the injection current is not flat.

Figure 6:
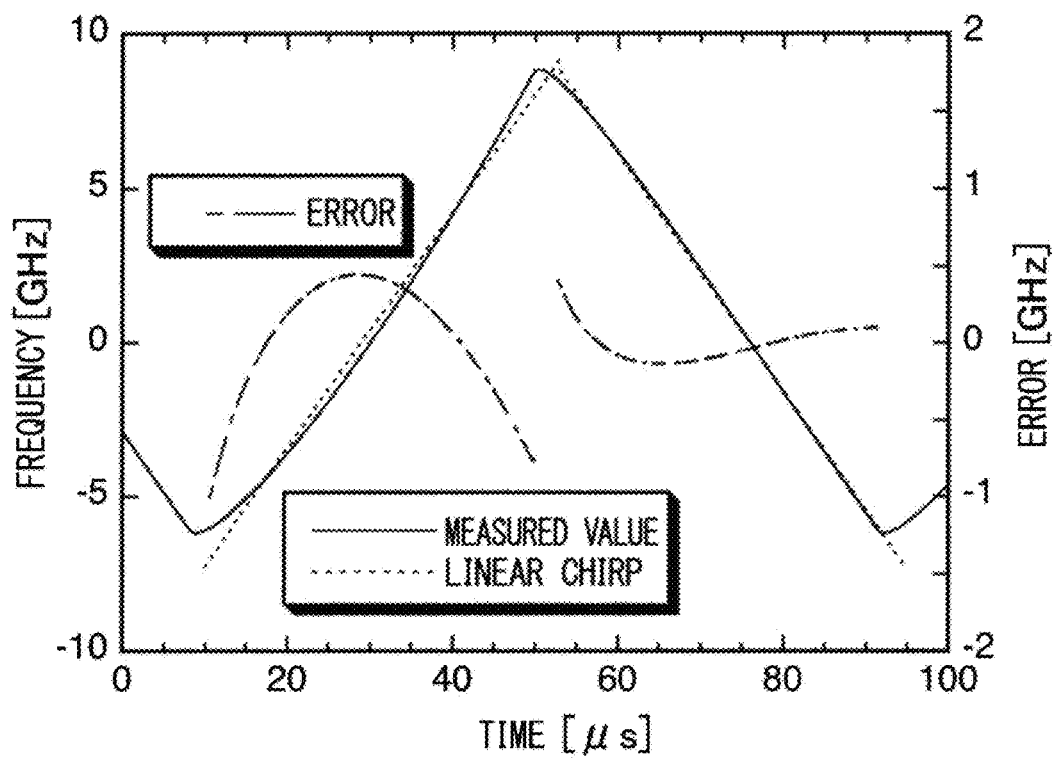
FIG. 6 is a diagram comparing the temporal waveform shown in FIG. 4 with an ideal linear chirp, in the second embodiment.

FIG. 6 is a diagram comparing the temporal waveform shown in FIG. 4 with an ideal linear chirp. The solid line represents the measured value, and the dotted line represents the linear chirp waveform. The measured value deviates slightly from the linear chirp waveform, and it can be seen that the error of the up-chirp is larger compared to the down-chirp. The dot-dashed line in FIG. 6 represents the error from the linear chirp, an error of 1.6 GHz occurs in the up-chirp and 0.68 GHz occurs in the down-chirp.

<Example of Optical Phase Modulation Measurement>

Next, an example of optical phase modulation measurement performed using the apparatus of the second embodiment will be described. Although an example of the second embodiment is shown here, the same can be applied to the first embodiment.

Figure 7:
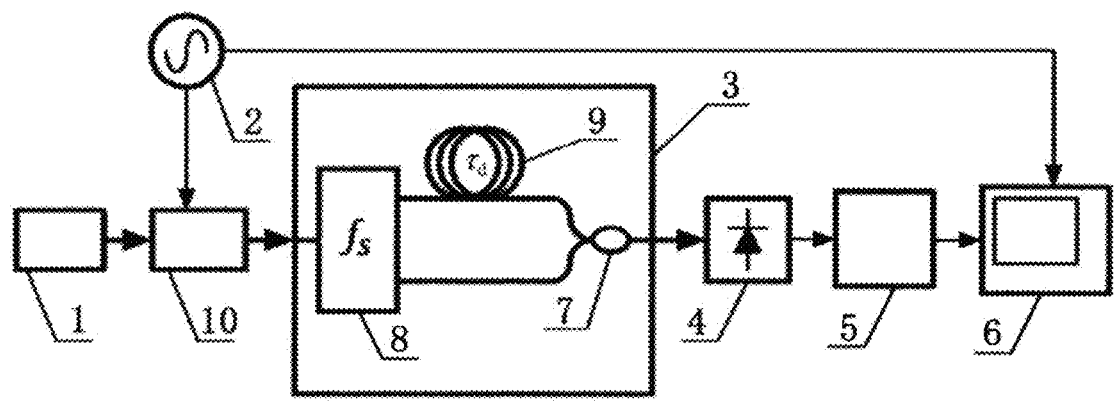
FIG. 7 is a diagram showing an apparatus used for optical phase modulation measurement in the second embodiment.

FIG. 7 is a diagram showing an apparatus used for optical phase modulation measurement. An external cavity semiconductor laser with a wavelength of 1552.1 nm and an output of 15 mW is used as output light of the laser 1. The output light is input to the optical phase modulator 10 and is phase-modulated. The optical phase modulator 10 is driven by the sawtooth signal generated from the signal generator 2. The sawtooth wave phase modulation is used for serrodyne modulation. The measurement apparatus includes a heterodyne interferometer 3, a photodetector 4, a phase demodulator 5, and a temporal waveform analyzer 6, and has the same configuration as the example of the optical frequency modulation measurement described above except that the temporal waveform of optical phase modulation is finally obtained. In FIG. 7, the output light phase-modulated by the optical phase modulator 10 is the laser light to be measured.

Figure 8:
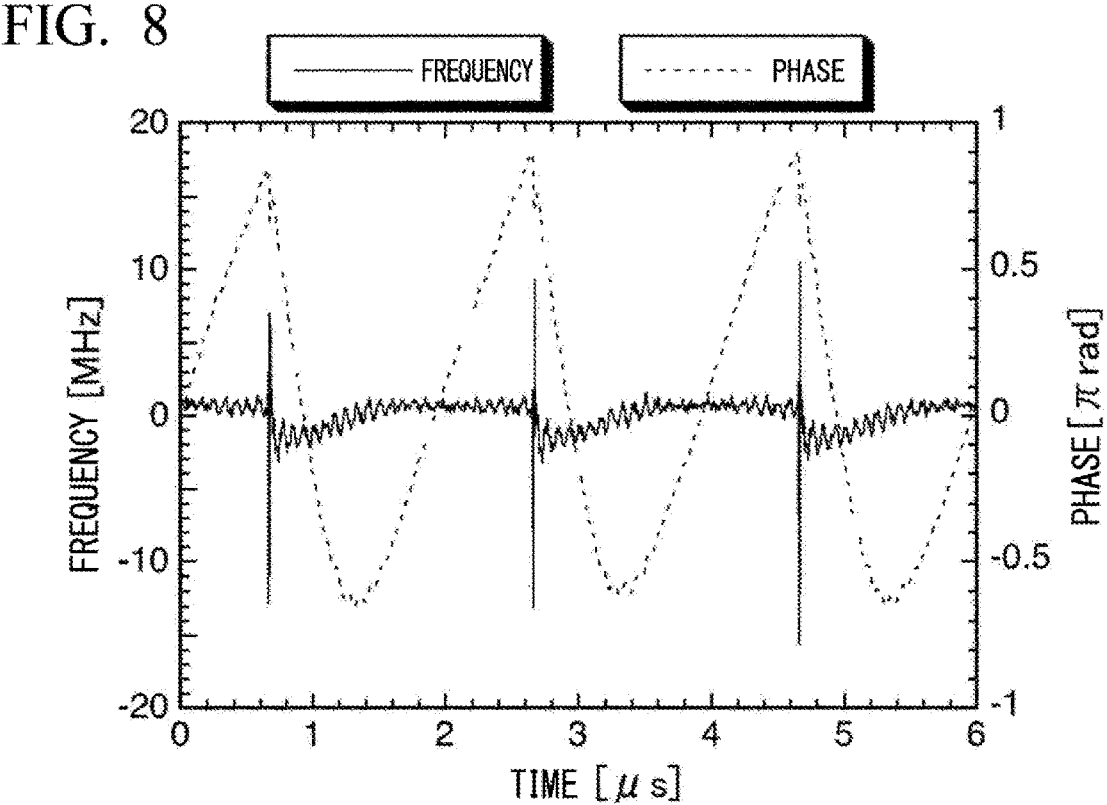
FIG. 8 is a diagram showing a temporal waveform in the case of performing optical phase modulation with a sawtooth signal in the second embodiment.
Figure 9:
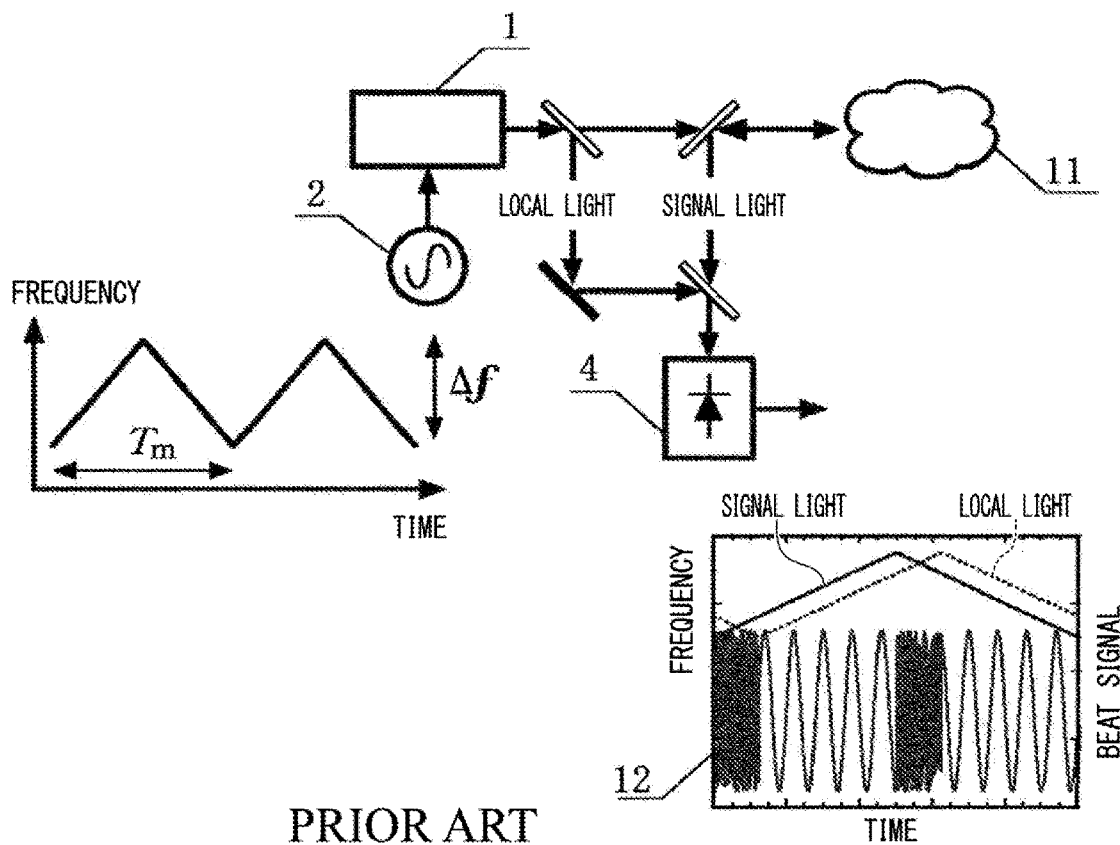
FIG. 9 is a diagram showing the principle of an FMCW lidar in the related art.
Figure 10:
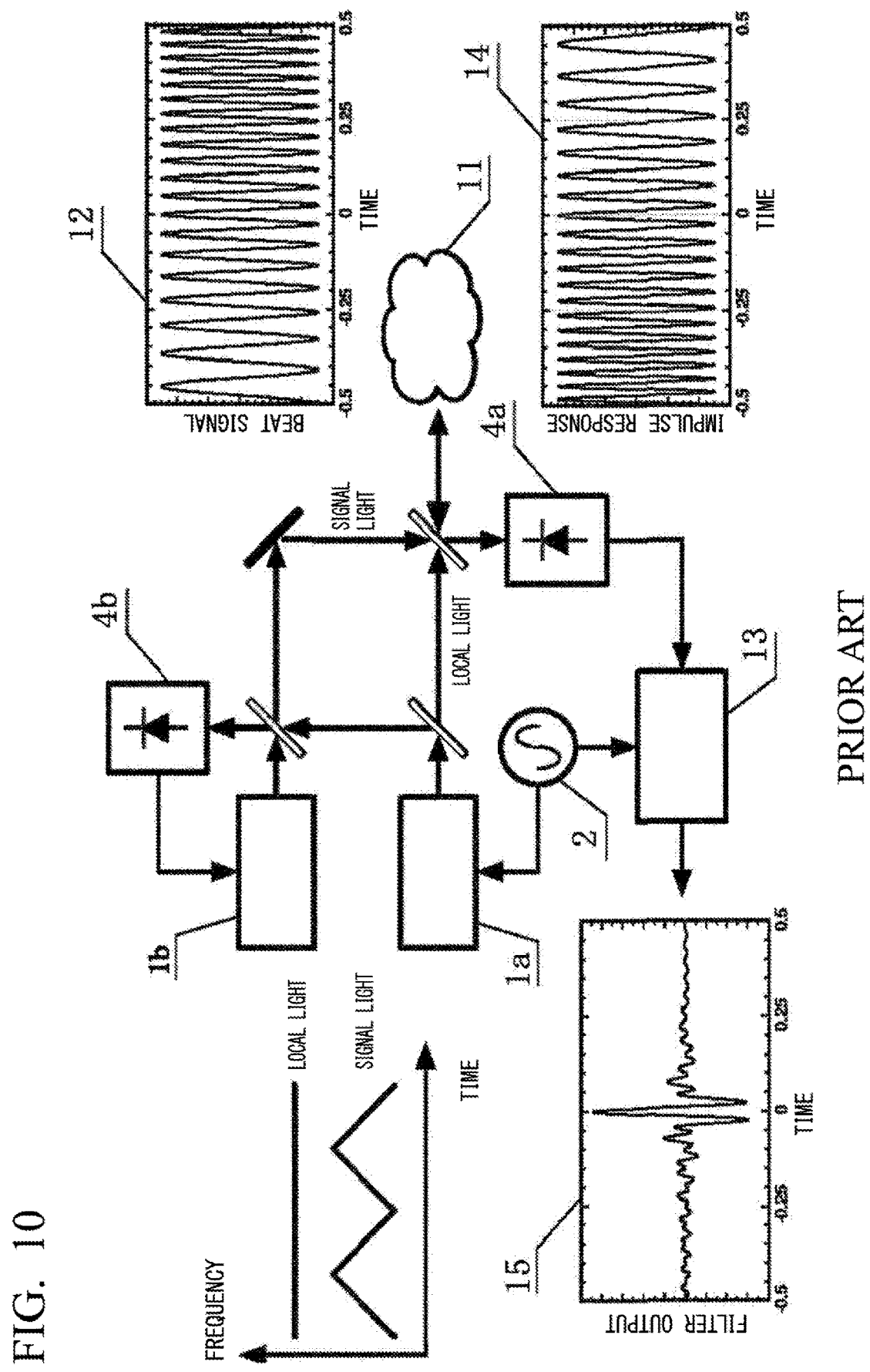
FIG. 10 is a diagram showing the principle of an FM chirp pulse compression lidar in the related art.
Figure 11:
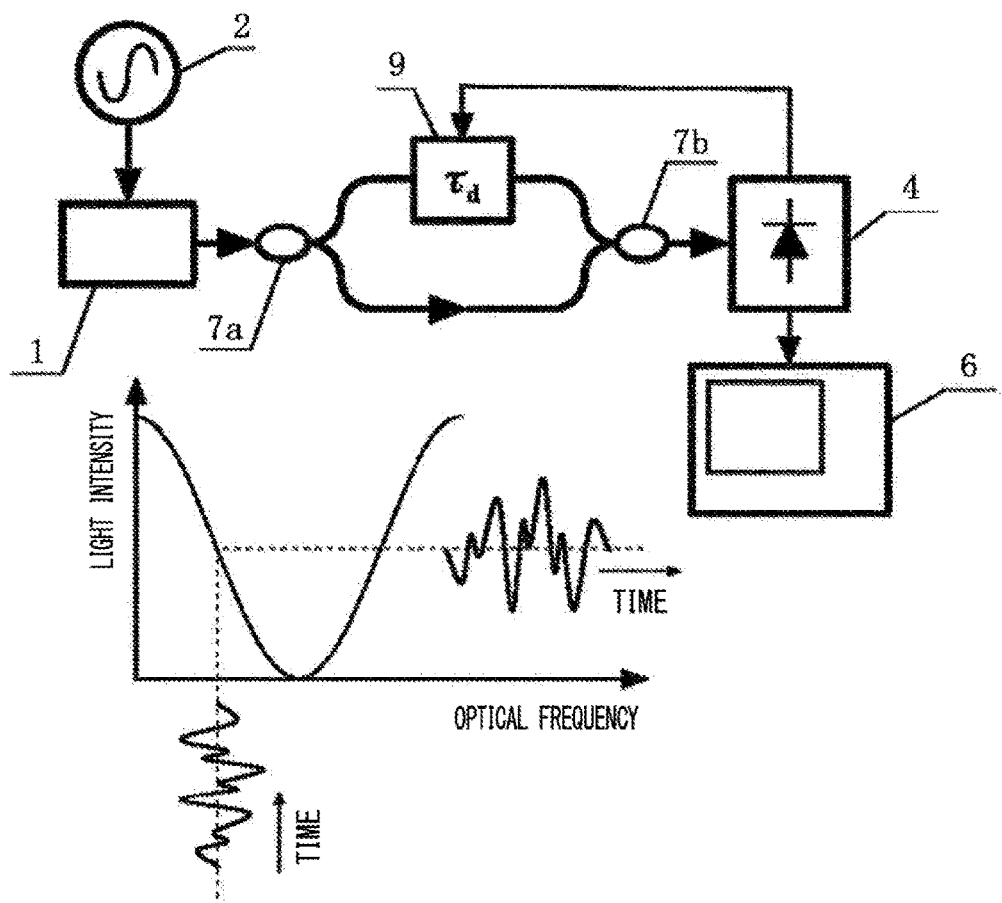
FIG. 11 is a diagram showing a optical angle modulation measurement apparatus using optical angle-to-intensity conversion by a Mach-Zehnder interferometer in the related art.
Figure 12:
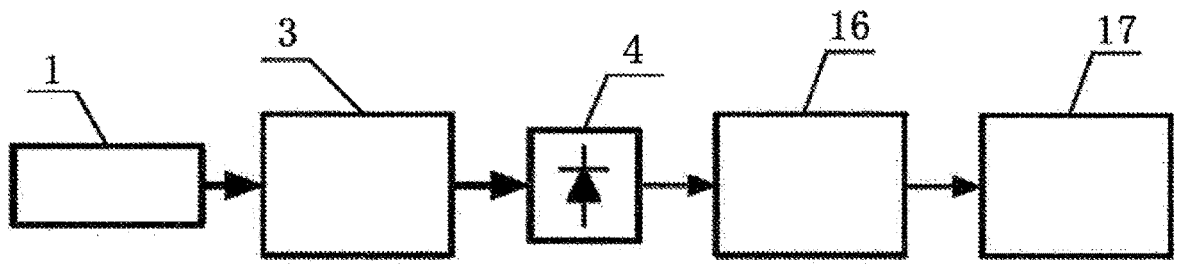
FIG. 12 is a diagram showing an optical frequency noise measurement apparatus using a delayed self-heterodyne method in the related art.

FIG. 8 is a diagram showing a temporal waveform in the case of performing optical phase modulation with a sawtooth signal, and shows temporal waveforms of the measured optical frequency and the optical phase obtained by integrating the optical frequency. The modulation frequency is 500 kHz, and the modulation voltage amplitude is 10.2 $V_{pp}$. Since the optical phase modulator 10 is disposed outside the laser, the change in optical frequency is smaller than in the case of the optical frequency modulation shown in FIG. 4. In parts where the direction of optical phase change is reversed, spike-like frequency change occurs. The temporal waveform of the optical phase obtained by integration has a shape close to a sawtooth wave, but it can be seen that waveform deterioration is caused by the response characteristic of the optical phase modulator 10.

In the optical angle modulation measurement apparatus and method of the present embodiment, the upper limit of the modulation frequency depends on the bandwidth of the modulation signal, the sampling rate and the analog bandwidth of the temporal waveform analyzer 6. In the examples of the optical frequency modulation and optical phase modulation measurement described above, the sampling rate is 2 GS/s, and the analog bandwidth is 1 GHz, so the bandwidth of the modulation signal is limited to within 1 GHz. In the case of triangular wave modulation, since the amplitude of the 31-st harmonic is approximately 1/1000 of that of the fundamental wave, the modulation frequency is about 30 MHz as the upper limit.

The examples shown in the above embodiments and the like are described to facilitate understanding of the invention, and the present invention is not limited to this embodiment.

INDUSTRIAL APPLICABILITY

By using the apparatus and method of the present invention for measuring the optical angle modulation of various types of laser output light, it becomes possible to accurately measure the temporal waveform of the optical frequency or optical phase modulation of the laser light source. This enables precise evaluation of the laser light source used in the lidar system or the like, and is useful for improving the performance of optical sensing.

REFERENCE SIGNS LIST 1 laser
1a signal laser
1b local laser
2 signal generator
3 heterodyne interferometer
4, 4a, 4b photodetector
5 phase demodulator
6 temporal waveform analyzer
7, 7a, 7b optical directional coupler
8 optical frequency shifter
9 optical delay medium
10 optical phase modulator
11 measuring object
12 beat signal waveform
13 matched filter
14 impulse response of matched filter
15 matched filter output waveform
16 vector signal analyzer
17 signal processing apparatus

The invention claimed is:

1. An optical angle modulation measurement apparatus for measuring by a delayed self-heterodyne method, the apparatus comprising:
   a heterodyne interferometer that is fed with laser light to be measured wherein the light is optical-angle modulated by a signal generator;
   a photodetector which is configured to receive output light of the heterodyne interferometer to perform heterodyne detection;
   a phase demodulator that is configured to demodulate a phase of a beat signal output from the photodetector; and
   a temporal waveform analyzer that is configured to obtain a temporal waveform of optical angle modulation, from the phase of the beat signal,
   wherein the heterodyne interferometer is a Mach-Zehnder interferometer including a first optical directional coupler that branches input laser light to be measured into two, a first optical path in which an optical frequency shifter of frequency shift $f_S$ is disposed, a second optical path having an optical delay medium with a delay time $\tau_d$, and a second optical directional coupler that combines an output of the first optical path and an output of the second optical path,
   wherein the output light of the heterodyne interferometer is output light of the second optical directional coupler,
   wherein the temporal waveform analyzer is a computer, and
   wherein when the optical angle modulation is optical frequency modulation, the temporal waveform analyzer is configured to obtain the temporal waveform of the optical frequency modulation of the laser light to be measured by multiplying the phase of the beat signal by $[2\pi\tau_d]^{-1}$ (where, $\tau_d$ is a delay time in the heterodyne interferometer).

2. The optical angle modulation measurement apparatus according to claim 1,
   wherein the temporal waveform of the optical angle modulation is a temporal waveform of at least one of optical frequency modulation and optical phase modulation.

3. The optical angle modulation measurement apparatus according to claim 1,
   wherein when the optical angle modulation is optical phase modulation, the temporal waveform analyzer is configured to obtain the temporal waveform of the optical phase modulation of the laser light to be measured, by multiplying the phase of the beat signal by $[2\pi\tau_d]^{-1}$ (where, $\tau_d$ is a delay time in the heterodyne interferometer) and integrating the value with respect to time.

4. The optical angle modulation measurement apparatus according to claim 1,
   wherein the heterodyne interferometer is configured to have a delay time set to a value below a time taken for an optical frequency or an optical phase change of the laser light to be measured.

5. The optical angle modulation measurement apparatus according to claim 1,
   wherein the heterodyne interferometer is configured for inputting zeroth order diffracted light of the optical frequency shifter to the optical delay medium, and configured for multiplexing and outputting first order diffracted light of the optical frequency shifter and output light of the optical delay medium by the optical directional coupler.

6. An optical angle modulation measurement method by a delayed self-heterodyne method, comprising:
   inputting laser light to be measured, wherein the laser light is optical-angle modulated, to a heterodyne interferometer;
   receiving output light of the heterodyne interferometer to perform heterodyne detection, by a photodetector; and
   obtaining a time waveform of optical angle modulation by demodulating a phase of the beat signal output from the photodetector;
   wherein the heterodyne interferometer is a Mach-Zehnder interferometer including a first optical directional coupler that branches input laser light to be measured into two, a first optical path in which an optical frequency shifter of frequency shift $f_S$ is disposed, a second optical path having an optical delay medium with a delay time $\tau_d$, and a second optical directional coupler that combines an output of the first optical path and an output of the second optical path,
   wherein the output light of the heterodyne interferometer is output light of the second optical directional coupler, and
   wherein when the optical angle modulation is optical phase modulation, the temporal waveform of the optical phase modulation of the laser light to be measured is obtained by multiplying the phase of the beat signal by $[2\pi\tau_d]^{-1}$ (where, $\tau_d$ is a delay time in the heterodyne interferometer) and integrating the value with respect to time.

7. The optical angle modulation measurement method according to claim 6,
   wherein when the optical angle modulation is optical frequency modulation, the temporal waveform of the optical frequency modulation of the laser light to be measured is obtained by multiplying the phase of the beat signal by $[2\pi\tau_d]^{-1}$ (where, $\tau_d$ is a delay time in the heterodyne interferometer).

8. The optical angle modulation measurement method according to claim 7,
   wherein the delay time in the heterodyne interferometer is set to a value below a time taken for an optical frequency or an optical phase change of the laser light to be measured.

9. The optical angle modulation measurement method according to claim 6,
   wherein the delay time in the heterodyne interferometer is set to a value below a time taken for an optical frequency or an optical phase change of the laser light to be measured.

\* \* \* \* \*